United States Patent

[11] 3,619,463

| [72] | Inventors | Jean-Pierre Budin |
| | | Paris; |
| | | Jean Raffy, Crosnes, both of France |
| [21] | Appl. No. | 4,369 |
| [22] | Filed | Dec. 20, 1970 |
| [45] | Patented | Nov. 9, 1971 |
| [73] | Assignee | Compagnie Generale E'Electricite |
| | | Paris, France |
| [32] | Priority | Jan. 20, 1969 |
| [33] | | France |
| [31] | | 69 00 965 |

[54] HEATING FURNACE
4 Claims, 3 Drawing Figs.

[52] U.S. Cl. .......................................... 13/1, 13/22,
73/16, 356/112
[51] Int. Cl. .......................................... G01b 9/02
[50] Field of Search .......................................... 356/112;
73/16; 13/1, 20–22

[56] References Cited
UNITED STATES PATENTS
| 3,377,912 | 4/1968 | Yates ............................ | 356/112 X |
| 3,406,275 | 10/1968 | Pedrotti ......................... | 13/20 X |

OTHER REFERENCES

"The Interference Method of Measuring Thermal Expansion" by G. E. Merritt, Research Paper No. 515; Reprint from Bureau of Standards Journal of Research, Vol. 10, Jan., 1933.

*Primary Examiner*—Bernard A. Gilheany
*Assistant Examiner*—R. N. Envall, Jr.
*Attorney*—Sughrue, Rothwell, Mion, Zinn & MacPeak

ABSTRACT: The coefficient of expansion and the thermal coefficient of the optical index in solids is measured by an interferential method employing a heating furnace consisting of two half-molds including heating elements. The half-molds are coupled together by elastic means acting perpendicularly to the axis of the half-molds which form a cylindrical housing open at both its ends.

HEATING FURNACE

BACKGROUND OF THE INVENTION

The present invention concerns methods of an apparatus for effecting the measurement of the expansion coefficient and the temperature coefficient of the optical index of solids and notably of crystals.

Many methods of measuring the expansion coefficient of solid bodies are known, notably the interference measuring method. This method consists of forming a FABRY and PEROT cavity by disposing two mirrors on the extreme faces of a specimen of the body being tested, which is in the form of a cylinder having an axial bore, and illuminating this cavity with a substantially monochromatic light in a direction parallel to the axis of the specimen. The measurement of the fringes which travel past a point when the specimen is subjected to a variation of temperature $T$, permits of deducing the variation $L$ of the initial length of the specimen, the expansion coefficient $K$ of the body being given by the formula $$K=(\Delta L)/L\Delta T$$

An example of an apparatus for carrying out this known method is illustrated in FIG. 1 of the accompanying drawings.

In this known method, the specimen is subjected to a variation of temperature $\Delta T$ by disposing it in a furnace which comprises heating means associated with a temperature-regulating device.

The furnaces hitherto employed have two major disadvantages:

it is difficult to bring both the furnace and the specimen to an equilibrium temperature for a very long time if the enclosure is placed under a vacuum, and it is almost impossible to maintain this temperature at a constant value.

For measuring the thermal coefficient of the optical index $n$ of a transparent specimen, the displacement of the interference fringes produced when the beam passes through the FABRY and PEROT cavity at the level of the wall of the specimen is studied. In this case, the variation $\Delta(nL)$, which is equal to $m\Delta L+L\Delta n$ is measured. Since $\Delta L$ is known from the preceding measurement, and $L$ and $n$ are known, the value of $n$ is immediately deduced therefrom.

The present invention has for its object to obviate these disadvantages.

BRIEF DESCRIPTION OF THE DRAWINGS

Further features and advantages of the present invention will become apparent from the description given in the following by way of nonlimiting illustration with reference to the accompanying drawings, in which.

DETAILED DESCRIPTION OF THE INVENTION

Figure 1:
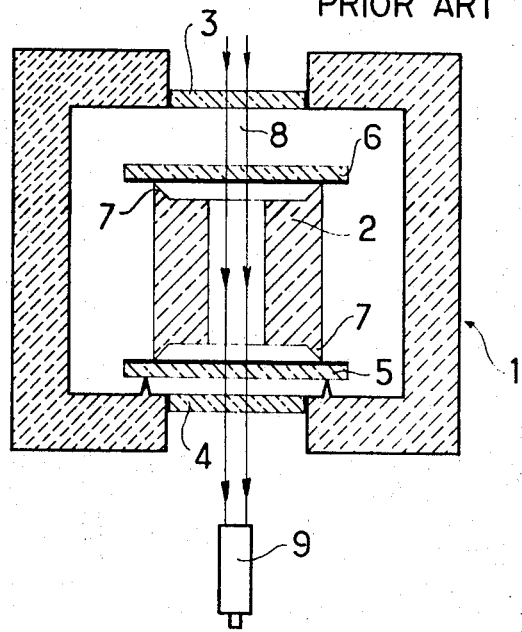
FIG. 1 diagrammatically illustrates a known apparatus for carrying out the method of measuring the expansion coefficients of solids.

The apparatus illustrated very diagrammatically in FIG. 1 comprises a furnace 1 in which there is disposed a specimen 2 formed of the body whose expansion coefficient is to be measured.

The furnace 1 comprises insulating walls in which there are provided two transparent windows 3 and 4. There is formed along the axis defined by these two windows a FABRY and PEROT cavity comprising the two semitransparent mirrors 5 and 6, between which the specimen 2 is disposed (the reflecting surfaces of the mirrors being in contact with the specimen).

The specimen 2 is so machined as to form a hollow cylinder serving as a support for the mirrors 5 and 6, which bear on pointed projections 7 situated on the terminal faces of the specimen 2, these projections being so machined that their ends define two absolutely parallel planes. In the case of the figure, the mirror 5 is disposed at the bottom of the furnace 1, the specimen 2 being disposed on the said mirror 5 and serving as a support for the mirror 6. A light beam 8 centered on the axis of the cylindrical specimen 2 illuminates the FABRY and PEROT cavity defined by the mirrors 5 and 6.

An observation glass 9 disposed in the path of the beam emerging from the cavity makes it possible to observe interference fringes in the form of alternately light and dark rings.

When a temperature variation $\Delta T$ is applied to the specimen 2, the latter undergoes an expansion, which causes interference fringes to travel past as a result of displacement of the mirrors 5 and 6. The variation of length $\Delta L$ of the specimen 2 can be calculated from the number of fringes travelling past a fixed point. In order to perform these measurements with very high precision, it is necessary to maintain the furnace successively at two constant equilibrium temperatures $T_0$ and $T$ such that $T1-T_0=\Delta T$.

With the apparatus illustrated in FIG. 1, it is not possible to obtain a sufficiently precise temperature regulation and to produce rapidly a thermal equilibrium of the assembly comprising the furnace 1 and the specimen 2.

Figure 2:
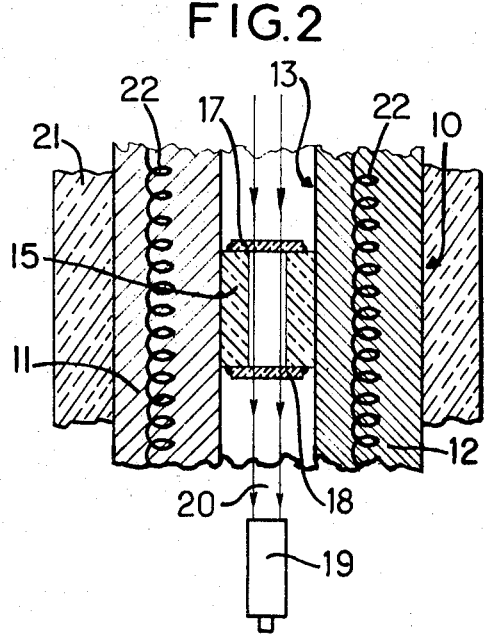
FIGS. 2 and 3 illustrate in axial and transverse section respectively an apparatus according to the invention.
Figure 3:
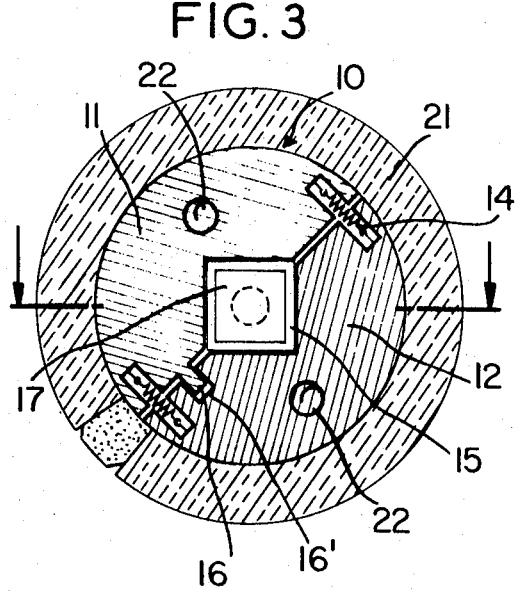

On the other hand, the furnace illustrated in FIGS. 2 and 3 makes it possible to obviate these disadvantages.

The furnace 10 of FIGS. 2 and 3 consists of two half-shells 11 and 12 juxtaposed and having central V-shaped recesses within their opposing surfaces so as to define a cylindrical gap 13 of square cross section, which is open at both ends. Return means represented by way of example by two helical springs 14 in the figure apply the half-shells one against the other. Each half-shell comprises heating elements 22.

A tenon 16 machined in one half-shell cooperates fairly freely with a recessed portion 16' in the other half-shell. The said tenon serves as a support and a guide for positioning these two half-shells opposite to one another.

The specimen 15 is so cut that the dimensions of its cross section are substantially the same as those of the cross section of the gap 14, so that the lateral walls of the said gap are brought into intimate contact with those of the specimen.

The specimen comprises two mirrors 17 and 18 to form, as before, a FABRY and PEROT cavity. These mirrors are fixed on the extreme faces of the specimen 15, for example by adhesive bonding.

Likewise, in order to detect the fringes travelling past a fixed point, there is employed an observation glass 19, which receives the beams 20 which have passed through the above-defined FABRY and PEROT cavity.

The furnace makes it possible to establish thermal contact with the walls of an appropriately cut specimen.

The members 11 and 12 of the furnace and the specimen being in contact, they form a unit which has high thermal inertia, so that it is unnecessary to employ thermal regulating devices and the windows such as 3 and 4 may even be omitted. The direct contact between the walls of the furnace and those of the specimen also makes it possible to produce a rapid temperature rise. With the walls of the furnace consisting of copper or silver, for example, a temperature rise is obtained with an appreciable saving of time (this time may be five or six times less than the time obtained with a normal furnace), as also a good stability of this temperature.

There may also be disposed around the furnace an unheated solid member 21 creating a screen between the walls of the furnace and the ambient atmosphere.

Measurements made on crystals having dimensions of the order of 5 cubic meters have given numerical results with a precision of more than 2 or $3\cdot10^{17}$.

Of course, the variation of the dimension of the specimen 15 takes place not only in the longitudinal direction, but also in the transverse direction. It is for this reason that the resilient means 14 operate substantially perpendicularly to the axis of the cylindrical gap 13 and have the object of absorbing the variations of the transverse dimensions of the specimen 2, while maintaining the inside faces of the half-shells 11 and 12 in contact with the lateral faces of the specimen 15. The cross section of the gap 13 is advantageously of square form, because the expansion coefficients of the material constituting the walls of the furnace and of the specimen are not generally identical and the faces of the furnace and of the specimen therefore slide slightly one upon the other. By adopting this square form, the thermal contact is always established, provided that the two half-shells bear one against the other in a plane defined by the diagonal plane of the gap 13 of square cross section.

The unavoidable friction of the inside faces of the members 11 and 12 on the lateral faces of the specimen 15 may be facilitated by coating the contacting faces with a heat-conducting grease, for example a silicone grease.

What is claimed is:

1. In a heating furnace supporting a specimen defining a FABRY and PEROT cavity and comprising two semicylindrical shells provided with heating elements and coupled together by resilient means acting substantially orthogonally to the axis of symmetry of the shells, the improvement comprising: aligned V-shaped recesses within the center of the opposed interior walls of said shell defining a gap in the form of a rectangular parallelepiped having a square cross section, said semicylindrical shells being oppositely disposed along the diagonal plane of the square cross section of the parallelepiped and said specimen being disposed within said shell gap and in intimate contact with the shell walls.

2. The furnace according to claim 1, further comprising means for positively locating said half-shells opposite one another.

3. The furnace according to claim 2, wherein said locating means consist of a tenon formed on one face of the two half-shells and a cooperating recess within the opposed face of the other half-shell.

4. The furnace according to claim 1, wherein the said half-shells are surrounded by a solid member.

* * * * *